United States Patent
Shattuck et al.

(10) Patent No.: US 10,086,935 B2
(45) Date of Patent: Oct. 2, 2018

(54) GUIDE VANES FOR A PUSHER PROPELLER FOR ROTARY WING AIRCRAFT

(71) Applicant: Sikorsky Aircraft Corporation, Stratford, CT (US)

(72) Inventors: Colman D. Shattuck, Colchester, CT (US); Peter F. Lorber, Southbury, CT (US); Blake Almy Moffitt, South Windsor, CT (US); Peter J. Germanowski, Newtown, CT (US); Brian E. Wake, South Glastonbury, CT (US); Steven D. Weiner, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 348 days.

(21) Appl. No.: 14/963,859

(22) Filed: Dec. 9, 2015

(65) Prior Publication Data

US 2016/0159476 A1    Jun. 9, 2016

Related U.S. Application Data

(60) Provisional application No. 62/089,377, filed on Dec. 9, 2014.

(51) Int. Cl.
*B64C 27/82*    (2006.01)
*B64C 23/06*    (2006.01)
*B64C 27/473*    (2006.01)

(52) U.S. Cl.
CPC .............. *B64C 27/82* (2013.01); *B64C 23/06* (2013.01); *B64C 27/473* (2013.01); *B64C 2027/8236* (2013.01)

(58) Field of Classification Search
CPC ............ B64C 27/82; B64C 2027/8236; B64C 2027/8254; B64C 2027/8263; B64C 2027/8272
See application file for complete search history.

(56) References Cited

U.S. PATENT DOCUMENTS

| 4,917,336 A | 4/1990 | Jacobs et al. |
| 5,123,613 A * | 6/1992 | Piasecki ................. B64C 27/82 244/17.13 |

(Continued)

FOREIGN PATENT DOCUMENTS

| EP | 0680872 A1 | 11/1995 |
| GB | 520984 A | 5/1940 |
| WO | 2013088068 A1 | 6/2013 |

OTHER PUBLICATIONS

Extended European Search Report dated Apr. 11, 2016 in corresponding EP Patent Application No. 15198458.0.

*Primary Examiner* — Brian M O'Hara
(74) *Attorney, Agent, or Firm* — Cantor Colburn LLP

(57) ABSTRACT

A propulsor system for a rotary winged aircraft includes a propeller including having a propeller hub rotatable about a propeller axis and a plurality of propeller blades secured to and extending radially outwardly from the propeller hub. The propeller is oriented on the rotary winged aircraft to provide forward thrust for the rotary winged aircraft when the propeller is rotated about the propeller hub. A plurality of guide vanes non rotatable about the propeller axis are positioned upstream of the plurality of propeller blades. The plurality of guide vanes are positioned to turn an airflow flowing into the plurality or propeller blades, thereby reducing an angle of attack of the plurality of propeller blades relative to the airflow.

11 Claims, 3 Drawing Sheets

(56) References Cited

U.S. PATENT DOCUMENTS

| | | | |
|---|---|---|---|
| 5,131,603 A | 7/1992 | Meyers | |
| 5,738,301 A * | 4/1998 | Francois | B64C 27/26 244/17.19 |
| 2008/0237392 A1 | 10/2008 | Piasecki et al. | |
| 2009/0159740 A1 | 6/2009 | Brody et al. | |
| 2010/0288379 A1 | 11/2010 | Dahm et al. | |

* cited by examiner

GUIDE VANES FOR A PUSHER PROPELLER FOR ROTARY WING AIRCRAFT

CROSS-REFERENCE TO RELATED APPLICATIONS

This application claims the benefit of priority of U.S. Provisional Application No. 62/089,377 filed Dec. 9, 2014, the disclosure of which is incorporated by reference.

BACKGROUND

The subject matter disclosed herein generally relates to rotary wing aircraft. More specifically, the subject disclosure relates to tail rotors, or propulsors for rotary wing aircraft.

A rotary wing aircraft includes one or more main rotor assemblies to provide lift and propulsive thrust. To provide additional thrust, the tail rotor, typically oriented with an axis of rotation perpendicular to the tail of the aircraft is oriented instead so its axis of rotation is along a forward to aft axis of the aircraft. In this orientation, the tail rotor acts as a pusher propeller or propulsor, providing additional forward thrust to the aircraft. The propulsor tends to be highly loaded, however, due to propulsor diameter and weight constraints, with the load a function of shaft horsepower input divided by a square of the diameter. The resulting propeller blades have a high angle of attack to the free stream air compared to a large diameter propeller blade at the same shaft horsepower to withstand the loading. The higher angle of attack results in significant losses of cruise propulsive efficiency.

BRIEF SUMMARY

In one embodiment, a propulsor system for a rotary winged aircraft includes a propeller including having a propeller hub rotatable about a propeller axis and a plurality of propeller blades secured to and extending radially outwardly from the propeller hub. The propeller is oriented on the rotary winged aircraft to provide forward thrust for the rotary winged aircraft when the propeller is rotated about the propeller hub. A plurality of guide vanes non rotatable about the propeller axis are positioned upstream of the plurality of propeller blades. The plurality of guide vanes are positioned to turn an airflow flowing into the plurality or propeller blades, thereby reducing an angle of attack of the plurality of propeller blades relative to the airflow.

Additionally or alternatively, in this or other embodiments the plurality of guide vanes are secured to an airframe of the rotary winged aircraft.

Additionally or alternatively, in this or other embodiments a number of guide vanes of the plurality of guide vanes is equal to a number of propeller blades of the plurality of propeller blades.

Additionally or alternatively, in this or other embodiments the effective angle of attack is in a range of 0 to 5 degrees.

Additionally or alternatively, in this or other embodiments a plurality of vortex generators are positioned upstream of the plurality of propeller blades.

Additionally or alternatively, in this or other embodiments a vortex generator of the plurality of vortex generators is located between adjacent guide vanes of the plurality of guide vanes.

Additionally or alternatively, in this or other embodiments the plurality of vortex generators have a rectangular, airfoil or circular cross-sectional shape.

In another embodiment a rotary winged aircraft includes an airframe and a drive system positioned at the airframe. One or more rotor systems are operably connected to the drive system to provide lift for the rotary winged aircraft. A propulsor system is positioned at the airframe and includes a propeller having a propeller hub rotatable about a propeller axis and a plurality of propeller blades secured to and extending radially outwardly from the propeller hub. The propeller is oriented on the rotary winged aircraft to provide forward thrust for the rotary winged aircraft when the propeller is rotated about the propeller hub. A plurality of guide vanes non rotatable about the propeller axis are located upstream of the plurality of propeller blades. The plurality of guide vanes are positioned to turn an airflow flowing into the plurality or propeller blades, thereby reducing an angle of attack of the plurality of propeller blades relative to the airflow.

Additionally or alternatively, in this or other embodiments the plurality of guide vanes are secured to an airframe of the rotary winged aircraft.

Additionally or alternatively, in this or other embodiments a number of guide vanes of the plurality of guide vanes is equal to a number of propeller blades of the plurality of propeller blades.

Additionally or alternatively, in this or other embodiments the effective angle of attack is in a range of 0 to 5 degrees.

Additionally or alternatively, in this or other embodiments a plurality of vortex generators are located upstream of the plurality of propeller blades.

Additionally or alternatively, in this or other embodiments a vortex generator of the plurality of vortex generators is located between adjacent guide vanes of the plurality of guide vanes.

Additionally or alternatively, in this or other embodiments the plurality of vortex generators have a rectangular, airfoil or circular cross-sectional shape.

Additionally or alternatively, in this or other embodiments the propulsor system is positioned at an extending tail of the airframe.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
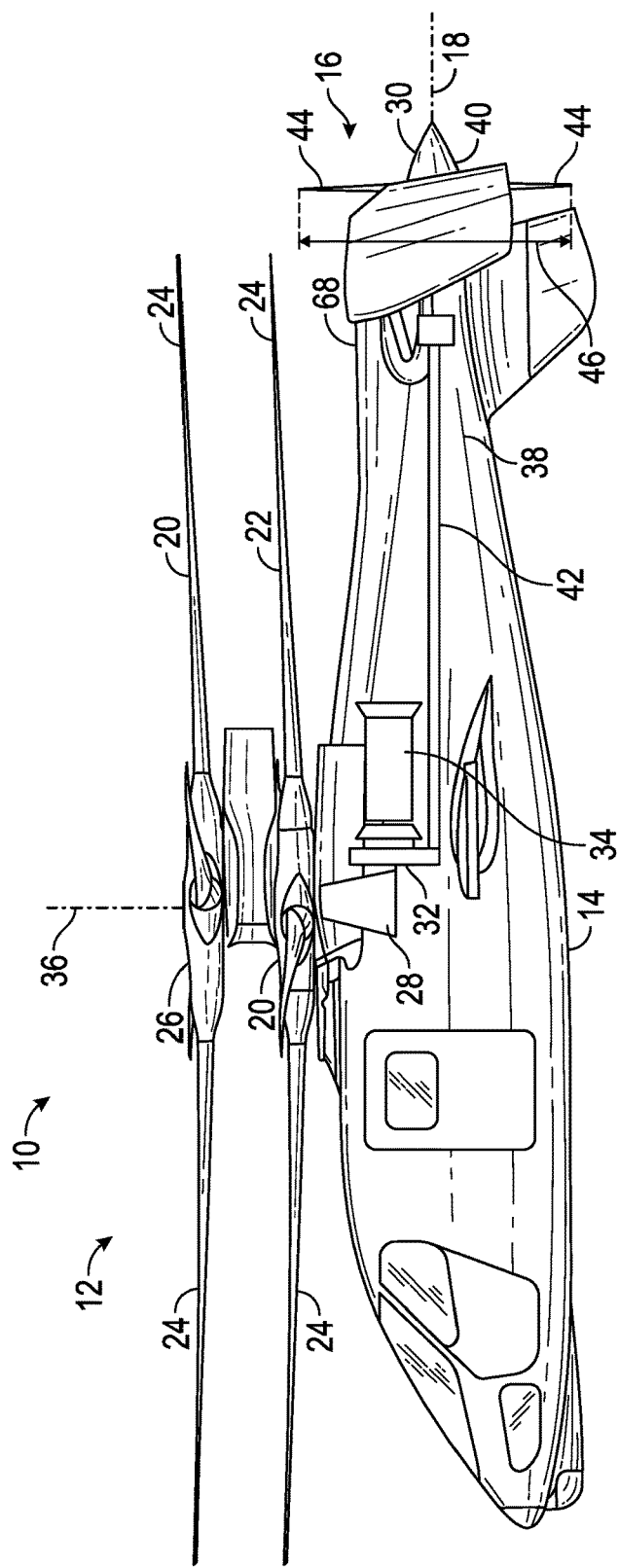
FIG. 1 is a general side view of an exemplary rotary winged aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18. It is to be appreciated that while a coaxial contra-rotating rigid rotor aircraft is shown in FIG. 1, it is to be appreciated that the present disclosure may be applied to other types of rotary wing aircraft including single rotor aircraft and articulating dual rotor or single rotor aircraft.

The main rotor system 12 includes an upper rotor system 20 and a lower rotor system 22 as dual contra-rotating main rotors in a coaxial configuration. A plurality of rotor blade assemblies 24 are mounted to a rotor hub assembly 26 of each rotor system 20, 22. The main rotor system 12 is driven by a transmission 28. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as a conventional single rotor system.

Figure 2:
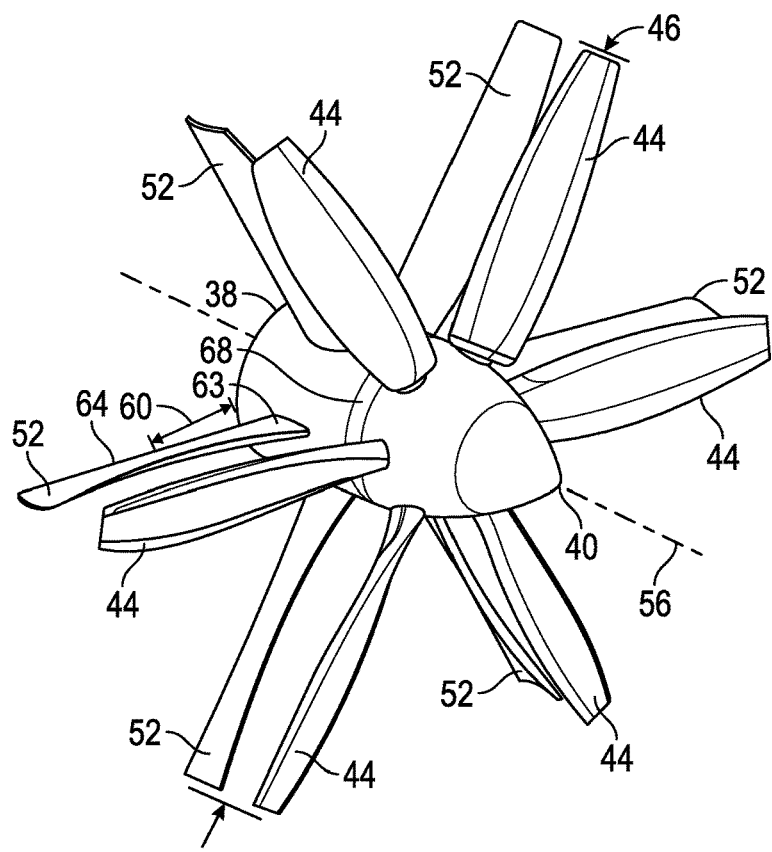
FIG. 2 is a perspective view of an embodiment of a propulsor for a rotary winged aircraft.

Referring now to FIG. 2, the propulsor 30 is located at a longitudinal end 68 of an extending tail 38 of the airframe 14 and includes a propeller hub 40 driven by a propeller shaft 42, operably connected to the main gearbox 32 (shown in FIG. 1). A plurality of propeller blades 44 extend radially outwardly from the propeller hub 40 defining a propeller diameter 46.

Figure 3:
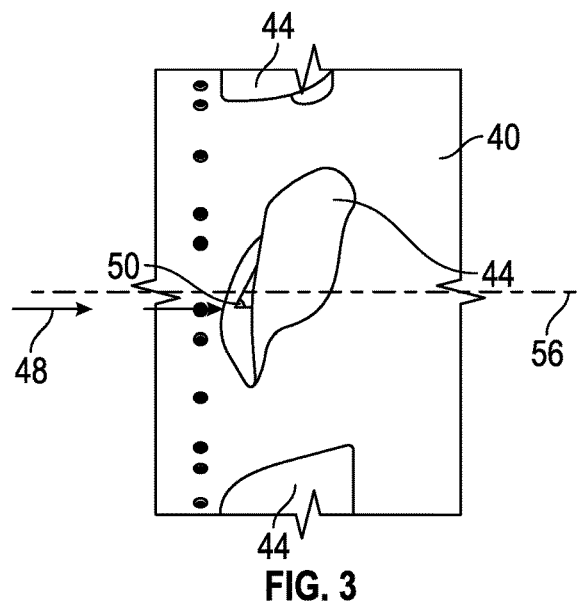
FIG. 3 is a side view of an embodiment of a propulsor for a rotary winged aircraft.
Figure 4:
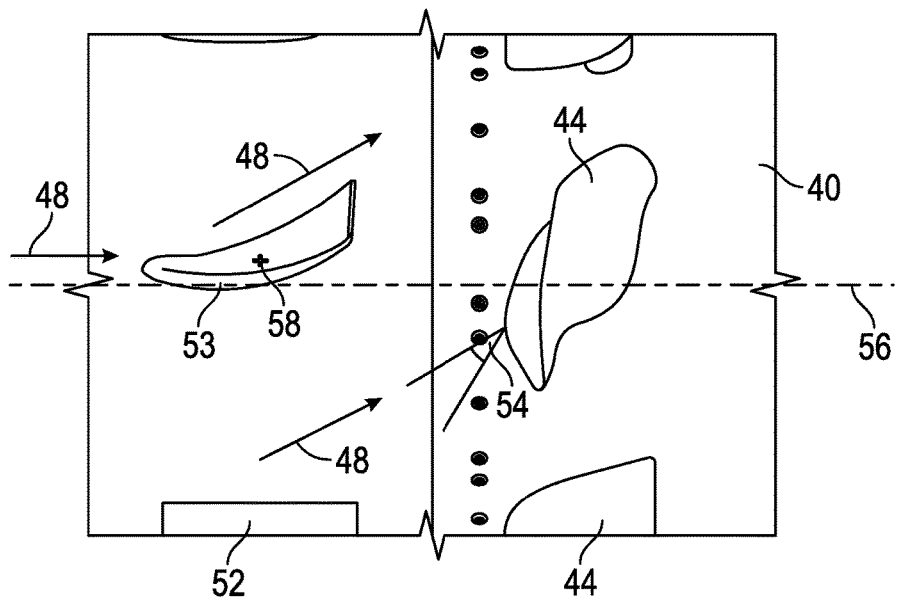
FIG. 4 is a side view of another embodiment of a propulsor for a rotary winged aircraft.

Referring now to FIG. 3, the propeller blades 44 are aligned to a flow of air 48 past the propeller blades 44 at an angle of attack 50. As shown in FIG. 4, a plurality of guide vanes 52 are located upstream of the propeller blades 44 to turn the flow of air 48 approaching the propeller blades 44 to reduce the angle of attack 50 to a lesser effective angle of attack 54. After flowing past the plurality of guide vanes 52, the flow of air 48 encounters the propeller blades 44 at the effective angle of attack 54. In some embodiments, the guide vanes 52 turn the flow of air 48 such that the effective angle of attack 54 is in the range of 0 to 5 degrees. In some embodiments, a number of guide vanes 52 is equal to a number of propeller blades 44, while in other embodiments, the number of guide vanes 52 may differ from the number of propeller blades 44 to prevent undesirable vibration modes in the propeller blades 44. While the propeller blades 44 rotate about a propeller axis 56 with the propeller hub 40, the guide vanes 52 are circumferentially fixed to the airframe 14 and do not rotate about the propeller axis 56. In some embodiments, the guide vanes 52 are fixed in position such that the effective angle of attack 54 is fixed, while in other embodiments, each guide vane 52 may be configured to rotate about a guide vane axis 58 driven by an actuator (not shown) or other device to modify the effective angle of attack 54 in selected operating conditions. Reducing the effective angle of attack 54 via use of the guide vanes 52 increases efficiency of the propulsor 30, increases an amount of propulsive thrust produced given a shaft horsepower and a propeller diameter 46. Further the guide vanes 52 reduce loads on the propeller blades 44 and thus the propeller blades 44 may be made as lighter weight structures and formed from, for example, light weight composite materials.

Referring again to FIG. 2, in some embodiments, inboard sections 60 of the guide vanes 52, those between, for example a root 62 and midspan 64 of the guide vanes 52 are tuned to reenergize a boundary layer of the flow of air 48 across the guide vanes 52, delaying separation of the boundary layer. Keeping boundary layer attached further aft reduces drag and increases efficiency.

Figure 5:
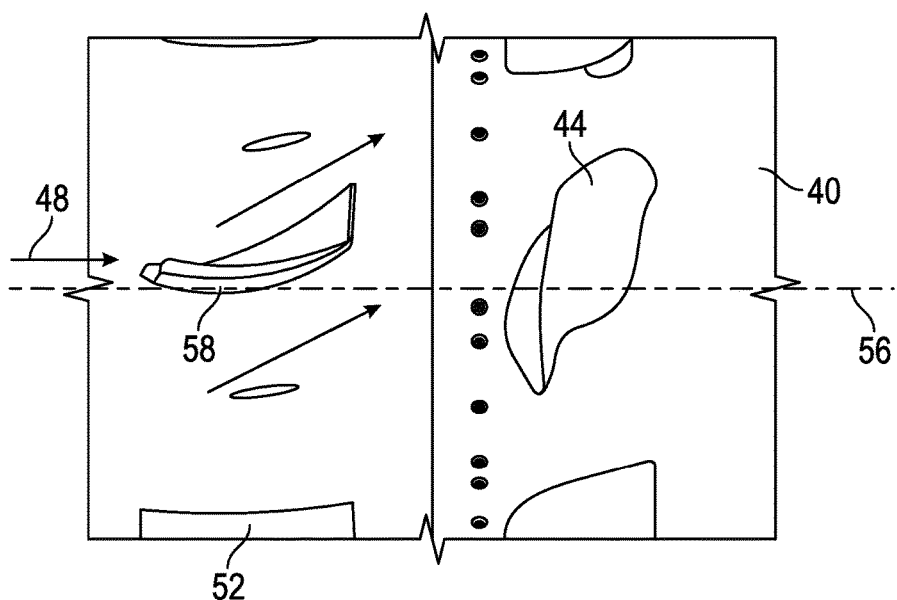
FIG. 5 is a side view of yet another embodiment of a propulsor for a rotary winged aircraft.

Referring now to FIG. 5, one or more vortex generators 66 may be positioned between adjacent guide vanes 52, and/or upstream or downstream of the guide vanes 52 at the airframe 14. The vortex generators 66 are aerodynamic structures extending from the airframe into the flow of air 48, and may have a cross-section that is, for example, rectangular, circular, or airfoil shaped. It is to be appreciated that the listed shapes are merely exemplary, and that other cross-sectional shapes may be utilized. Further, the vortex generators 66 have a smaller radial height than the guide vanes 52. The vortex generators 66 create a tip vortices that draw energetic, rapidly-moving air from outside the slow-moving boundary layer into contact with the airframe 14, thus reenergizing the boundary layer and reducing drag.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propulsor system for a rotary winged aircraft comprising:
   a propeller including:
      a propeller hub rotatable about a propeller axis; and
      a plurality of propeller blades secured to and extending radially outwardly from the propeller hub, the propeller oriented on the rotary winged aircraft to provide forward thrust for the rotary winged aircraft when the propeller is rotated about the propeller hub;
   a plurality of guide vanes non rotatable about the propeller axis and disposed upstream of the plurality of propeller blades, the plurality of guide vanes positioned to turn an airflow flowing into the plurality or propeller blades, thereby reducing an angle of attack of the plurality of propeller blades relative to the airflow; and a plurality of vortex generators disposed upstream of the plurality of propeller blades, wherein a vortex generator of the plurality of vortex generators is disposed between adjacent guide vanes of the plurality of guide vanes.

2. The propulsor system of claim 1, wherein the plurality of guide vanes are secured to an airframe of the rotary winged aircraft.

3. The propulsor system of claim 1, wherein a number of guide vanes of the plurality of guide vanes is equal to a number of propeller blades of the plurality of propeller blades.

4. The propulsor system of claim 1, wherein the effective angle of attack is in a range of 0 to 5 degrees.

5. The propulsor system of claim 1, wherein the plurality of vortex generators have a rectangular, airfoil or circular cross-sectional shape.

6. A rotary winged aircraft comprising:
an airframe;
a drive system disposed at the airframe;
one or more rotor systems operably connected to the drive system to provide lift for the rotary winged aircraft; and
a propulsor system disposed at the airframe including:
a propeller including:
a propeller hub rotatable about a propeller axis; and
a plurality of propeller blades secured to and extending radially outwardly from the propeller hub, the propeller oriented on the rotary winged aircraft to provide forward thrust for the rotary winged aircraft when the propeller is rotated about the propeller hub;
a plurality of guide vanes non rotatable about the propeller axis and disposed upstream of the plurality of propeller blades, the plurality of guide vanes positioned to turn an airflow flowing into the plurality or propeller blades, thereby reducing an angle of attack of the plurality of propeller blades relative to the airflow; and
a plurality of vortex generators disposed upstream of the plurality of propeller blades, wherein a vortex generator of the plurality of vortex generators is disposed between adjacent guide vanes of the plurality of guide vanes.

7. The aircraft of claim 6, wherein the plurality of guide vanes are secured to an airframe of the rotary winged aircraft.

8. The aircraft of claim 6, wherein a number of guide vanes of the plurality of guide vanes is equal to a number of propeller blades of the plurality of propeller blades.

9. The aircraft of claim 6, wherein the effective angle of attack is in a range of 0 to 5 degrees.

10. The aircraft of claim 6, wherein the plurality of vortex generators have a rectangular, airfoil or circular cross-sectional shape.

11. The aircraft of claim 6, wherein the propulsor system is disposed at an extending tail of the airframe.

* * * * *